(12) United States Patent
Iyama

(10) Patent No.: US 12,196,620 B2
(45) Date of Patent: Jan. 14, 2025

(54) MOTOR TEMPERATURE ESTIMATION SYSTEM, MOTOR TEMPERATURE ESTIMATION METHOD, AND MOTOR TEMPERATURE ESTIMATION PROGRAM

(71) Applicant: TOYOTA JIDOSHA KABUSHIKI KAISHA, Toyota (JP)

(72) Inventor: Hiroyuki Iyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 374 days.

(21) Appl. No.: 17/712,537

(22) Filed: Apr. 4, 2022

(65) Prior Publication Data

US 2022/0316954 A1 Oct. 6, 2022

(30) Foreign Application Priority Data

Apr. 6, 2021 (JP) .................. 2021-064644

(51) Int. Cl.
*G01K 1/20* (2006.01)

(52) U.S. Cl.
CPC ........... *G01K 1/20* (2013.01); *G01K 2205/00* (2013.01)

(58) Field of Classification Search
CPC ........ G01K 1/20; G01K 2205/00; G01K 7/42; G01K 13/08
See application file for complete search history.

(56) References Cited

U.S. PATENT DOCUMENTS

| 2009/0189561 | A1* | 7/2009 | Patel | H02H 7/0852 |
| | | | | 310/68 C |
| 2015/0048772 | A1* | 2/2015 | Nagata | H02K 11/21 |
| | | | | 318/634 |
| 2019/0288626 | A1* | 9/2019 | Yamada | G01R 31/343 |

FOREIGN PATENT DOCUMENTS

| JP | 2005-204358 A | 7/2005 |
| JP | 2007-315994 A | 12/2007 |

* cited by examiner

*Primary Examiner* — Jennifer Bahls
(74) *Attorney, Agent, or Firm* — Dinsmore & Shohl LLP

(57) ABSTRACT

A motor temperature estimation system includes a first temperature time series data generation unit that generates first temperature time series data based on temperature data acquired by a temperature sensor that measures a temperature of a motor, a resistance value time series data generation unit that generates resistance value time series data based on the first temperature time series data, a second temperature time series data generation unit that generates second temperature time series data by changing parameters for estimating and calculating the temperature of the motor based on the resistance value time series data, and a parameter determination unit that determines the parameters by comparing the first temperature time series data and the second temperature time series data.

5 Claims, 6 Drawing Sheets

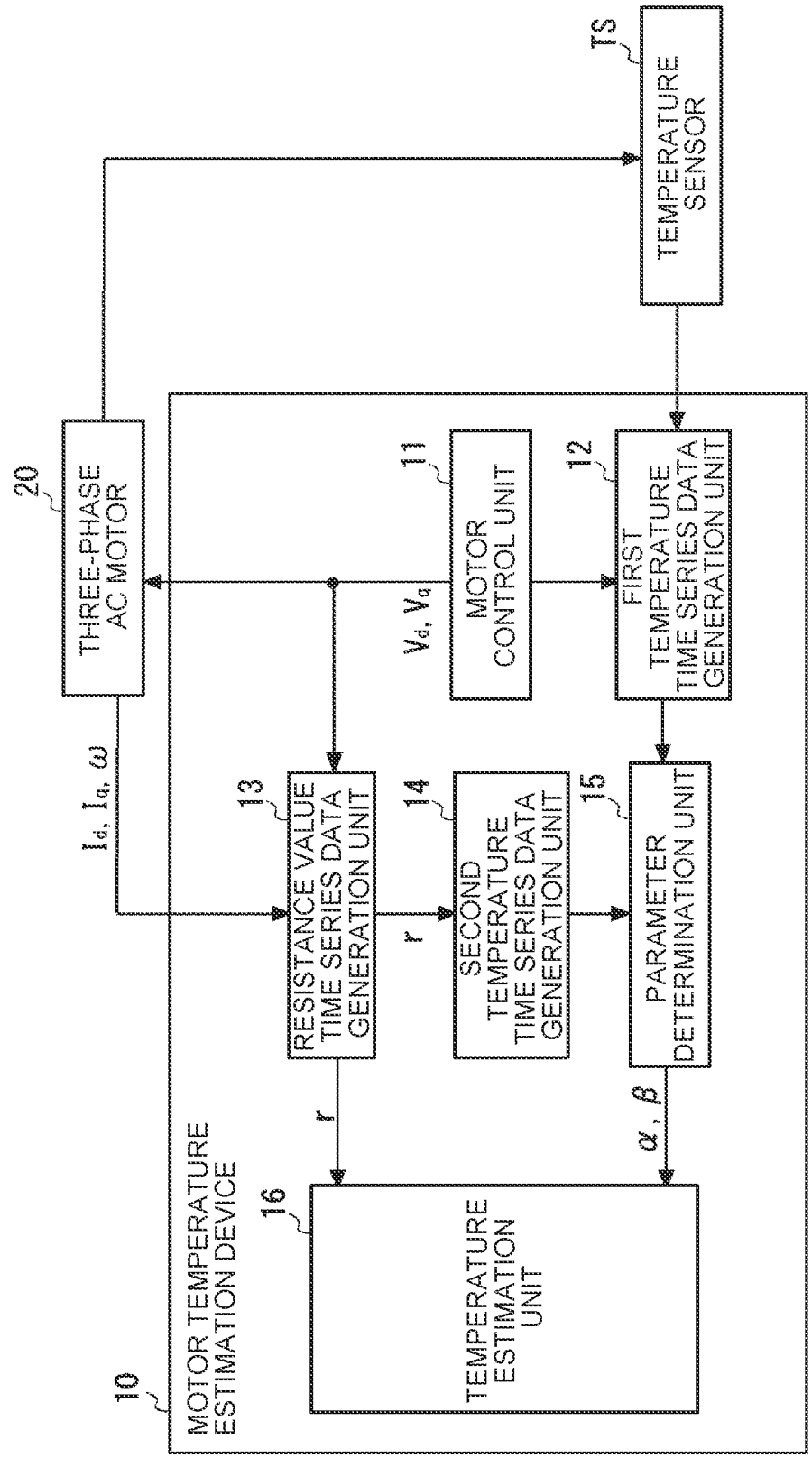

$I_d$ $\varepsilon$ $I_q$ $V_q$

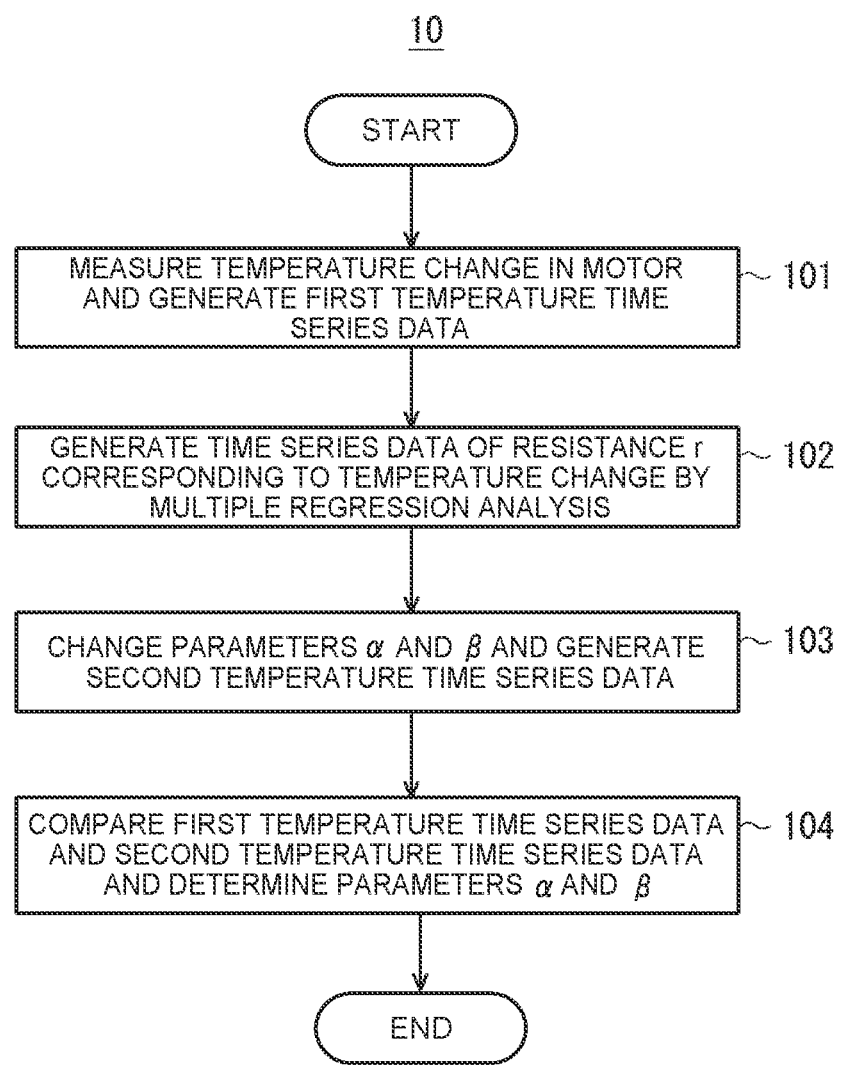

MOTOR TEMPERATURE ESTIMATION SYSTEM, MOTOR TEMPERATURE ESTIMATION METHOD, AND MOTOR TEMPERATURE ESTIMATION PROGRAM

CROSS-REFERENCE TO RELATED APPLICATION

This application claims priority to Japanese Patent Application No. 2021-064644 filed on Apr. 6, 2021, incorporated herein by reference in its entirety.

BACKGROUND

1. Technical Field

The present disclosure relates to a motor temperature estimation system, a motor temperature estimation method, and a motor temperature estimation program.

2. Description of Related Art

In a rotary electric machine, a motor generates heat due to magnet eddy current caused by high-speed rotation of a rotor. The heat generated by the motor may cause malfunctions such as a decrease in torque of a rotary motor. Therefore, it is necessary to constantly monitor a motor temperature. In many cases, in the rotor of the rotary electric machine, the motor temperature cannot be directly measured due to its structure. Therefore, various motor temperature estimation methods have been proposed. Japanese Unexamined Patent Application Publication No. 2005-204358 (JP 2005-204358 A) discloses a technique relating to a device for estimating a motor temperature based on a motor current value and a change value of the motor temperature without directly measuring the motor temperature.

SUMMARY

When the motor temperature is estimated using the technique disclosed in JP 2005-204358 A, the temperature is estimated based on a difference between the previously measured temperature of the motor and the current temperature of the motor. At this time, for example, due to the influence of a change in the motor temperature caused by an external heat source or the like, there is a possibility that a sufficient improvement in motor temperature estimation accuracy cannot be expected.

The present disclosure has been made to solve such a problem, and an object of the present disclosure is to provide a motor temperature estimation system, a motor temperature estimation method, and a motor temperature estimation program with motor temperature estimation accuracy improved.

A motor temperature estimation system according to one aspect of the present disclosure includes a first temperature time series data generation unit that generates first temperature time series data based on temperature data acquired by a temperature sensor that measures a temperature of a motor, a resistance value time series data generation unit that generates resistance value time series data based on the first temperature time series data, a second temperature time series data generation unit that generates second temperature time series data by changing parameters for estimating and calculating the temperature of the motor based on the resistance value time series data, and a parameter determination unit that determines the parameters by comparing the first temperature time series data and the second temperature time series data.

A motor temperature estimation method according to the one aspect of the present disclosure includes a step of generating first temperature time series data based on temperature data acquired by a temperature sensor that measures a temperature of a motor, a step of generating resistance value time series data based on the first temperature time series data, a step of generating second temperature time series data by changing parameters for estimating and calculating the temperature of the motor based on the resistance value time series data, and a step of determining the parameters by comparing the first temperature time series data and the second temperature time series data.

A program according to the one aspect of the present disclosure causes a computer to execute a process of generating first temperature time series data based on temperature data acquired by a temperature sensor that measures a temperature of a motor, a process of generating resistance value time series data based on the first temperature time series data, a process of generating second temperature time series data by changing parameters for estimating and calculating the temperature of the motor based on the resistance value time series data, and a process of determining the parameters by comparing the first temperature time series data and the second temperature time series data.

An estimation calculation unit that estimates and calculates the temperature of the motor using the parameters may be further included. With such a configuration, accuracy of estimating the temperature of the motor can be improved.

The resistance value time series data generation unit may generate the resistance value time series data based on a current value acquired by applying a voltage to the motor and a rotational speed. With such a configuration, a temperature change caused by a heat source from the outside of the motor appears as a change in a resistance value, so that the accuracy of estimating the motor temperature can be improved.

When the resistance value is defined as r, and the parameters are defined as $\alpha$ and $\beta$, the temperature T of the motor is estimated and calculated by $T=\alpha r+\beta$. With such a configuration, since the estimation method does not use the previous temperature is adopted, the temperature of the motor can be estimated without being affected by the initial temperature due to the power of the motor being turned on again.

According to the present disclosure, it is possible to provide a motor temperature estimation system, a motor temperature estimation method, and a motor temperature estimation program with motor temperature estimation accuracy improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2 is a block diagram showing a configuration of a motor temperature estimation device according to a first embodiment of the present disclosure;

FIG. 6 is a flowchart of a process for obtaining the motor temperature according to the first embodiment of the present disclosure.

DETAILED DESCRIPTION OF EMBODIMENTS

Hereinafter, embodiments of the present disclosure will be described with reference to the drawings. Since the drawings are simple, the technical scope of the embodiments should not be narrowly interpreted based on the description of the drawings. Further, the same elements are designated by the same reference signs, and duplicate description will be omitted. Further, in the following embodiments, when the number of elements (including the number, the numerical value, the quantity, the range, etc.) is referenced, the number is not limited to the specific number, and may be the specific number or more, or the specific number or less, except for a case when the number is specified in particular, or when the number is clearly limited to the specific number in principle, etc.

First Embodiment

Figure 1:
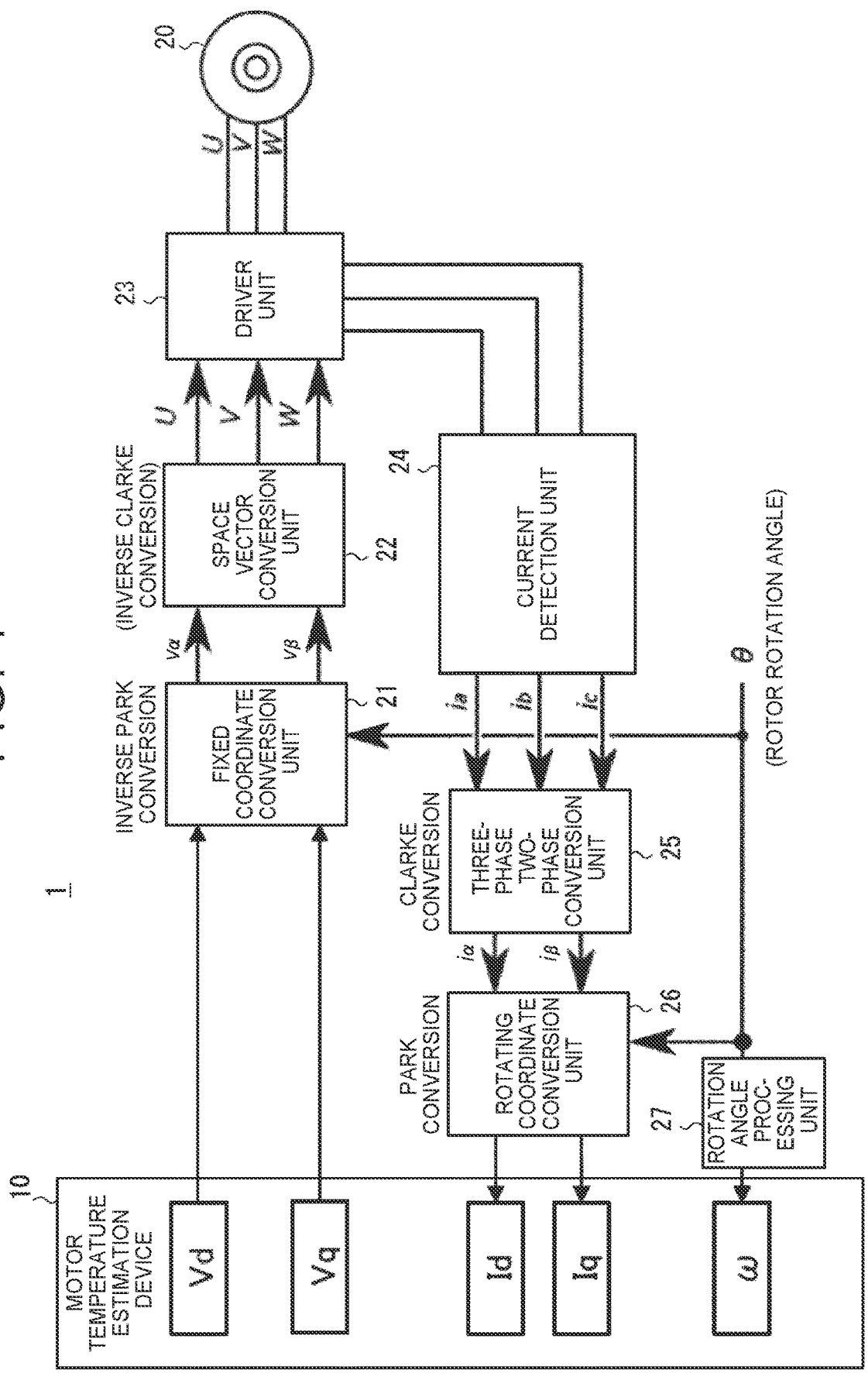
FIG. 1 is a block diagram showing a configuration of a motor control device according to a first embodiment of the present disclosure.

A motor control device 1 according to an embodiment will be described with reference to FIG. 1. FIG. 1 is a block diagram showing a configuration of the motor control device 1 according to the embodiment. The motor control device 1 controls a three-phase alternating current (AC) motor 20.

The three-phase AC motor 20 includes, for example, a rotor and a stator, and includes a U phase, a V phase, and a W phase. The three-phase AC motor 20 may include an angle sensor (not shown) that detects rotation angle θ of the rotor.

The motor control device 1 includes a motor temperature estimation device 10, a fixed coordinate conversion unit 21, a space vector conversion unit 22, a driver unit 23, a current detection unit 24, a three-phase two-phase conversion unit 25, a rotating coordinate conversion unit 26, and a rotation angle processing unit 27.

The motor temperature estimation device 10 acquires a rotational speed ω, dq-axis voltages $V_d$ and $V_q$, and dq-axis currents $I_d$ and $I_q$ of the three-phase AC motor 20, and estimates and calculates a temperature T of the motor based on these values.

The fixed coordinate conversion unit 21 performs coordinate conversion processing on an input voltage to the three-phase AC motor 20. The coordinate conversion processing may be performed by inverse Park conversion that converts a signal of the dq rotating coordinate system into a signal of the αβ orthogonal coordinate system based on the rotation angle θ of the three-phase AC motor 20. The input voltage to the three-phase AC motor 20 is the dq-axis voltages $V_d$ and $V_q$. The fixed coordinate conversion unit 21 outputs the calculated voltage of the orthogonal coordinate system to the space vector conversion unit 22. The output α-axis and β-axis voltages are hereinafter referred to as αβ-axis voltages $V_\alpha$ and $V_\beta$.

The space vector conversion unit 22 inputs the αβ-axis voltages $V_\alpha$ and $V_\beta$ from the fixed coordinate conversion unit 21. The space vector conversion unit 22 performs coordinate conversion processing on the αβ-axis voltages $V_\alpha$ and $V_\beta$. The coordinate conversion processing may be performed by inverse Clarke conversion that converts a signal in the αβ orthogonal coordinate system into a signal in the time domain of the three-phase coordinate system. The space vector conversion unit 22 calculates the voltages corresponding to the three phases of the three-phase AC motor 20, that is, the phase voltages $V_u$, $V_v$, and $V_w$ that are obtained by performing the coordinate conversion processing on the U-phase voltage, the V-phase voltage, and the W-phase voltage. The space vector conversion unit 22 outputs the calculated phase voltages $V_u$, $V_v$, and $V_w$ to the driver unit 23.

The driver unit 23 rotates the three-phase AC motor 20. The driver unit 23 outputs the three-phase phase current converted to alternating current to the three-phase AC motor 20. The driver unit 23 may include, for example, a plurality of switching elements such as an Insulated Gate Bipolar Transistor (IGBT) and a metal-oxide-semiconductor field-effect transistor (MOSFET), and a shunt resistor.

The current detection unit 24 is a form of the current detection device. The current detection unit 24 detects the phase current output from the driver unit 23 to each phase of the three-phase AC motor 20. The current detection unit 24 outputs the detected each-phase phase current $i_a$, $i_b$, and $i_c$ to the three-phase two-phase conversion unit 25.

The three-phase two-phase conversion unit 25 acquires the phase currents $i_a$, $i_b$, and $i_c$ from the current detection unit 24. The three-phase two-phase conversion unit 25 calculates the two-phase currents $i_\alpha$ and $i_\beta$ by performing the coordinate conversion processing on the phase currents $i_a$, $i_b$ and $i_c$. The coordinate conversion processing may be performed by Clarke conversion that converts the signal in the time domain of the three-phase coordinate system into the signal in the αβ orthogonal coordinate system. The three-phase two-phase conversion unit 25 outputs the calculated two-phase currents $i_\alpha$ and $i_\beta$ to the rotating coordinate conversion unit 26.

The rotating coordinate conversion unit 26 acquires the two-phase currents $i_\alpha$ and $i_\beta$ from the three-phase two-phase conversion unit 25. Further, the rotating coordinate conversion unit 26 converts the signal in the orthogonal coordinate system into the signal in the rotating coordinate system by the coordinate conversion processing. The coordinate conversion processing may be performed by Park conversion that converts the currents $i_\alpha$ and $i_\beta$ in the αβ orthogonal coordinate system into the currents $I_d$ and $I_q$ in the dq rotating coordinate system based on the rotation angle θ of the three-phase AC motor 20.

The rotation angle processing unit 27 calculates the rotational speed w of the rotor based on the rotation angle θ of the rotor acquired from the three-phase AC motor 20. The rotation angle processing unit 27 outputs the calculated rotational speed ω of the rotor to the motor temperature estimation device 10.

The configuration of the motor temperature estimation device 10 will be described with reference to FIG. 2. FIG. 2 is a block diagram showing the configuration of the motor temperature estimation device 10 according to the embodiment. As shown in FIG. 2, the motor temperature estimation device 10 includes a motor control unit 11, a first temperature time series data generation unit 12, a resistance value time series data generation unit 13, a second temperature time series data generation unit 14, and a parameter determination unit 15, and a temperature estimation unit 16.

The motor control unit 11 outputs the dq-axis voltages $V_d$ and $V_q$ to the three-phase AC motor 20 to control the three-phase AC motor 20. Here, the dq-axis voltages $V_d$ and $V_q$ are also input to the resistance value time series data generation unit 13. The motor control unit 11 may be provided outside the motor temperature estimation device 10.

The first temperature time series data generation unit 12 generates first temperature time series data based on the temperature data of the three-phase AC motor 20 acquired from a temperature sensor TS. As the temperature sensor TS, various sensors such as a thermocouple sensor and an infrared sensor can be used.

The resistance value time series data generation unit 13 generates time series data of resistance r of the three-phase AC motor 20 based on the dq-axis voltages $V_d$ and $V_q$ applied to the three-phase AC motor 20, the dq-axis currents $I_d$ and $I_q$ that are current values of the three-phase AC motor 20 acquired by applying the dq-axis voltages $V_d$ and $V_q$, and the rotational speed ω. That is, the resistance value time series data generation unit 13 generates a change in the resistance r caused by a change in the measured temperature of the three-phase AC motor 20 as time series data (resistance value time series data).

The second temperature time series data generation unit 14 generates second temperature time series data based on the generated resistance value time series data of the three-phase AC motor 20. Specifically, the second temperature time series data is generated by changing parameters α and β in the formula 1 (T=αr+β) for estimating and calculating the temperature T of the three-phase AC motor 20. In the formula 1, the parameters α and β are constants, and the resistance r is a variable. In order to determine the values of the parameters α and β, the second temperature time series data generation unit 14 substitutes the value of the resistance value time series data generated by the resistance value time series data generation unit 13 into the resistance r in the formula 1, and changes the parameters α and β. The details of the formula 1 will be described later.

The temperature estimation unit 16 estimates and calculates the temperature T of the three-phase AC motor 20 actually used by using the formula 1 in which the parameters α and β have been determined. At that time, the resistance r that is a variable in the formula 1 is, as described above, calculated by the resistance value time series data generation unit 13 based on the dq-axis voltages $V_d$ and $V_q$ applied to the three-phase AC motor 20, the dq-axis currents $I_d$ and $I_q$ acquired from the three-phase AC motor 20, and the rotational speed ω. Therefore, the temperature estimation unit 16 acquires the resistance r from the resistance value time series data generation unit 13.

The temperature estimation unit 16 estimates and calculates the temperature T of the three-phase AC motor 20 actually in operation by using the formula 1 in which the parameters α and β have been determined. At that time, the resistance r that is a variable in the formula 1 is, as described above, calculated by the resistance value time series data generation unit 13 based on the dq-axis voltages $V_d$ and $V_q$ applied to the three-phase AC motor 20, the dq-axis currents $I_d$ and $I_q$ acquired from the three-phase AC motor 20, and the rotational speed ω. Therefore, the temperature estimation unit 16 acquires the resistance r from the resistance value time series data generation unit 13.

The flow of the motor temperature estimation processing performed by the motor temperature estimation device 10 will be described in detail below. Further, the motor temperature estimation device 10 is a form of the motor temperature estimation system, and each function of the motor temperature estimation device 10 may be divided into a plurality of devices.

The motor temperature estimation device 10 may be provided with the hardware configuration based on a microcomputer including a central processing unit (CPU) for performing arithmetic processing, control processing, and the like, a memory composed of a read-only memory (ROM) in which arithmetic programs, control programs, and the like to be executed by the CPU are stored, and a random access memory (RAM), and an interface unit (I/F) that inputs and outputs a signal to and from the outside. In this case, the CPU, the memory, and the interface unit included in the motor temperature estimation device 10 are connected to each other via a data bus or the like.

Further, the motor temperature estimation device 10 is a form of the motor temperature estimation system, and each function of the motor temperature estimation device 10 may be divided into a plurality of devices.

Motor Temperature Estimation Processing Flow

Here, a motor temperature estimation method performed by the motor temperature estimation device 10 will be described as follows.

A relationship between the temperature T of the three-phase AC motor 20 and the resistance r of the three-phase AC motor 20 is expressed as in the formula 1 using the parameters α and β that are constants. The motor temperature estimation device 10 estimates the temperature T of the three-phase AC motor 20 using the formula 1.

$$T = \alpha r + \beta \quad \text{[Formula 1]}$$

By applying an alternating current to the three-phase AC motor 20, the temperature T of the three-phase AC motor 20 changes. When the temperature T of the motor changes, the resistance r of the three-phase AC motor 20 also changes. Therefore, by acquiring the resistance r of the three-phase AC motor 20, the temperature T of the three-phase AC motor 20 can be estimated using the formula 1.

The motor temperature estimation device 10 performs the following processing in order to determine the parameters α and β in the formula 1. First, a method for obtaining the resistance r of the three-phase AC motor 20 will be described. As shown in FIG. 2, the resistance value time series data generation unit 13 of the motor temperature estimation device 10 calculates the resistance r using a voltage equation in which the current values of the three-phase AC motor 20 are the dq-axis currents $I_d$ and $I_q$. $L_d$ is the d-axis inductance, $L_q$ is the q-axis inductance, φ is the induced voltage constant, and the rotational speed ω is the rotational speed of the three-phase AC motor 20. At this time, the resistance r is expressed as the voltage equation as shown in the following formulas 2 and 3.

First, a method for obtaining the resistance r of the three-phase AC motor 20 will be described. The motor temperature estimation device 10 calculates the resistance r using the voltage equation in which the current values of the three-phase AC motor 20 are the dq-axis currents $I_d$ and $I_q$. $L_d$ is the d-axis inductance, $L_q$ is the q-axis inductance, φ is the induced voltage constant, and the rotational speed ω is the rotational speed of the three-phase AC motor 20. At this time, the resistance r is expressed as the voltage equation as shown in the following formulas 2 and 3.

$$r = \frac{V_q - \omega L_d I_d - \omega \varphi}{I_q} \quad \text{[Formula 2]}$$

$$r = \frac{V_d + \omega L_q I_q}{I_d} \quad \text{[Formula 3]}$$

In the formulas 2 and 3, the dq-axis inductances $L_d$ and $L_q$ and the induced voltage constant φ are unknown values. By modifying the formulas 2 and 3, the dq-axis voltages $V_d$ and $V_q$ are expressed as following formulas 4 and 5, respectively. In order to obtain the dq-axis inductances $L_d$ and $L_q$ and the induced voltage constant φ, the time series data of the dq-axis voltages $V_d$ and $V_q$ and the formula 4 or the formula 5 are used.

$$V_d = rI_d - \omega L_q I_q \quad \text{[Formula 4]}$$

$$V_q = rI_q + \omega(L_d I_d + \varphi) \quad \text{[Formula 5]}$$

Here, the time series data of the rotational speed ω and the dq-axis currents $I_d$ and $I_q$ obtained by applying the dq-axis voltages $V_d$ and $V_q$ to the three-phase AC motor 20 will be described with reference to FIGS. 3A to 3D and FIGS. 4A to 4D. FIGS. 3A to 3D are graphs showing time series data of the rotational speed ω and the dq-axis currents $I_d$ and $I_q$ obtained when the d-axis voltage $V_d$ is applied to the three-phase AC motor 20. FIGS. 4A to 4D are graphs showing time series data of the rotational speed ω and the dq-axis currents $I_d$ and $I_q$ obtained when the q-axis voltage $V_q$ is applied to the three-phase AC motor 20.

The resistance value time series data generation unit 13 of the motor temperature estimation device 10 calculates the resistance r based on the time series data of the dq-axis voltages $V_d$ and $V_q$ applied to the three-phase AC motor 20 and the time series data of the obtained rotational speed ω and the obtained dq-axis currents $I_d$ and $I_q$ of the three-phase AC motor 20.

Figure 3A:
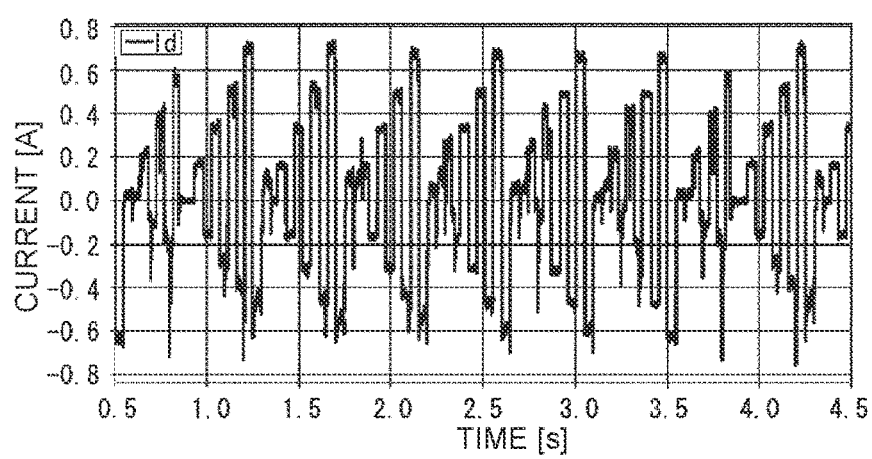
FIG. 3A is time series graph of a current value of a motor according to the first embodiment of the present disclosure.
Figure 3B:
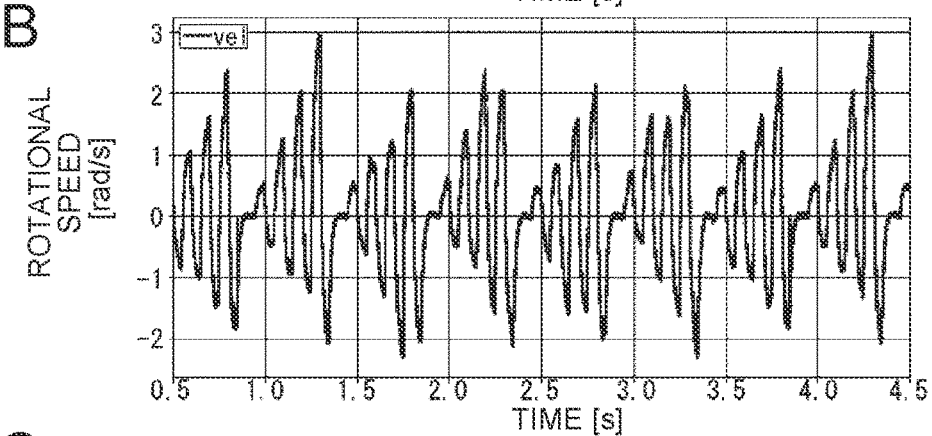
FIG. 3B is time series graph of a rotational speed of the motor according to the first embodiment of the present disclosure.
Figure 3C:
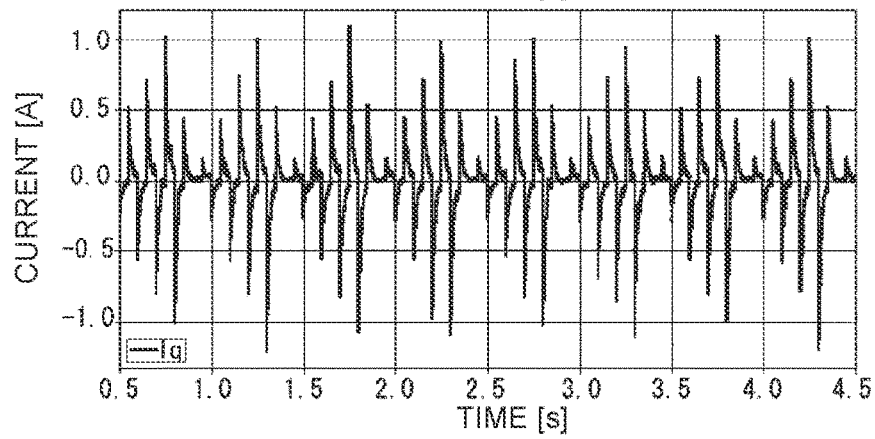
FIG. 3C is time series graph of a current value of the motor according to the first embodiment of the present disclosure.
Figure 3D:
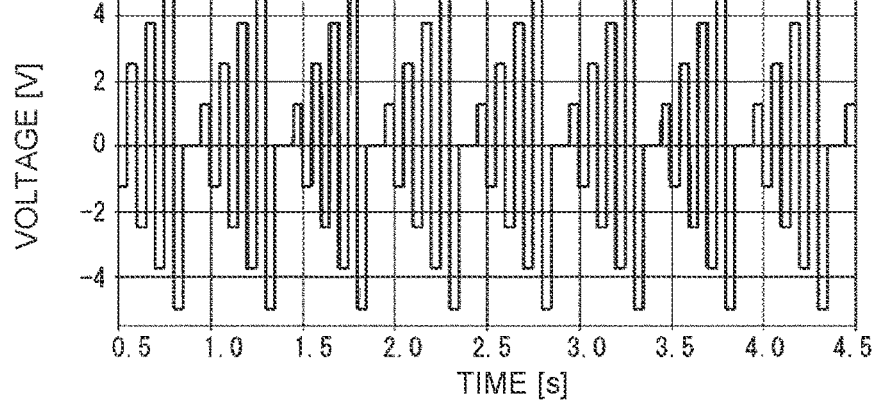
FIG. 3D is time series graph of a voltage value of the motor according to the first embodiment of the present disclosure.
Figure 4A:
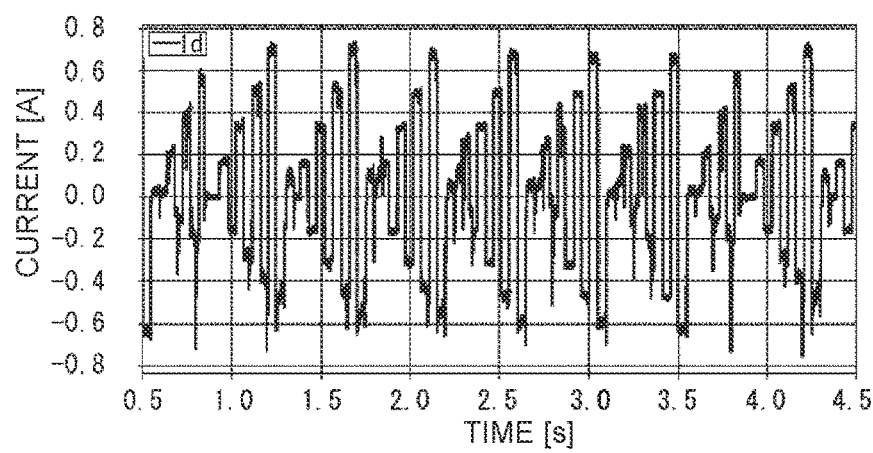
FIG. 4A is time series graph of a current value of the motor according to the first embodiment of the present disclosure.
Figure 4B:
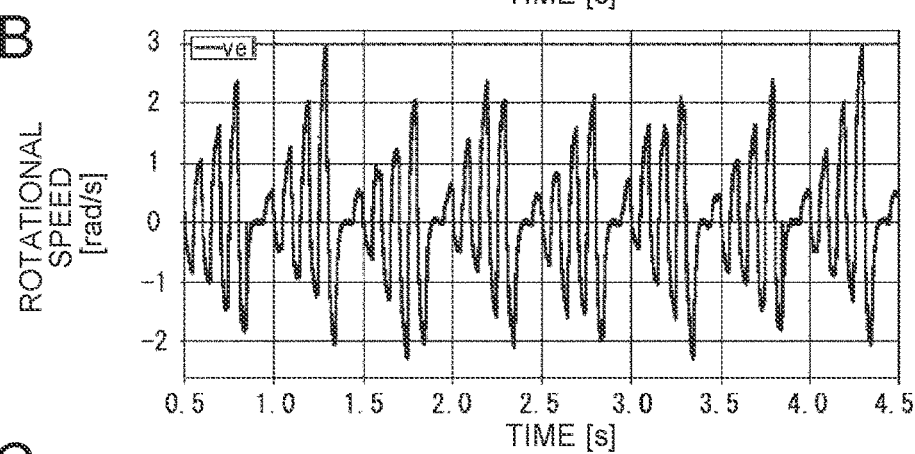
FIG. 4B is time series graph of a rotational speed of the motor according to the first embodiment of the present disclosure.
Figure 4C:
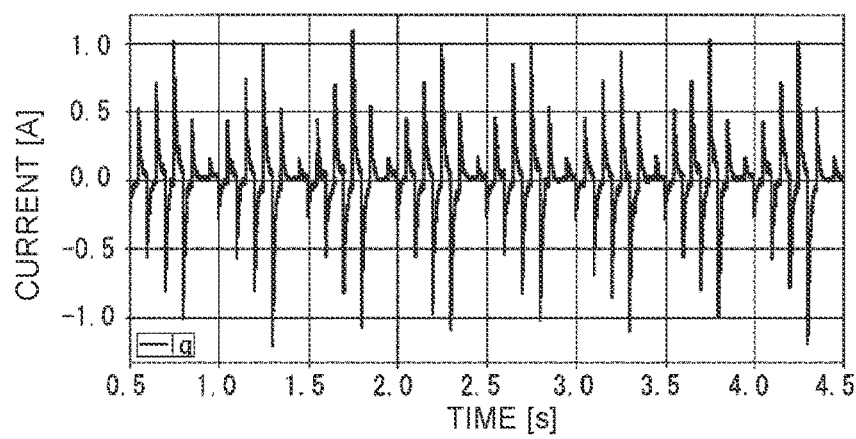
FIG. 4C is time series graph of a current value of the motor according to the first embodiment of the present disclosure.
Figure 4D:
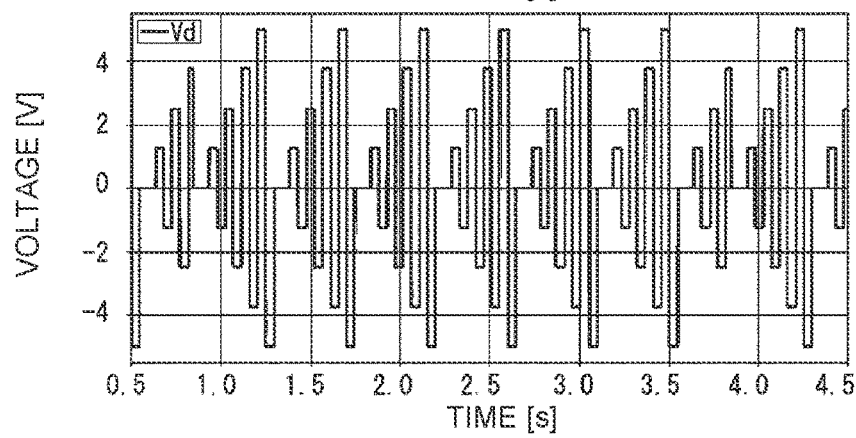
FIG. 4D is time series graph of a voltage value of the motor according to the first embodiment of the present disclosure.

More specifically, by applying the q-axis voltage $V_q$ shown in FIG. 3D to the three-phase AC motor 20, each time series data of the q-axis current $I_q$ shown in FIG. 3A, the rotational speed ω shown in FIG. 3B, and the d-axis current $I_d$ shown in FIG. 3C can be obtained. Further, by applying the d-axis voltage $V_d$ represented by the time series data shown in FIG. 4D to the three-phase AC motor 20, each time series data of the d-axis current $I_d$ shown in FIG. 4A, the rotational speed ω shown in FIG. 4B, and the q-axis current $I_q$ shown in FIG. 4C can be obtained.

Multiple regression analysis is performed based on the time series data of the q-axis current $I_q$ shown in FIG. 3A, the rotational speed ω shown in FIG. 3B, and the d-axis current $I_d$ shown in FIG. 3C, so that the q-axis inductance $L_q$ can be obtained. Further, multiple regression analysis is performed based on the time series data of the d-axis current $I_d$ shown in FIG. 4A, the rotational speed ω shown in FIG. 4B, and the q-axis current $I_q$ shown in FIG. 4C, so that values of the d-axis inductance $L_d$ and the induced voltage constant φ can be calculated.

The resistance r can be obtained using the formula 2 or the formula 3 based on the values of the dq-axis inductances $L_d$ and $L_q$ and the induced voltage constant φ calculated by the above method. As a result, the resistance value time series data generation unit 13 generates time series data of the resistance r (resistance value time series data). To obtain the resistance r, it may be possible to select whether to use the formula 2 or the formula 3 depending on an operating region. For the operating region, for example, when the d-axis current $I_d$ is equal to zero, the denominator becomes zero, and the formula 3 cannot be used, so that the formula 2 is used.

Figure 5:
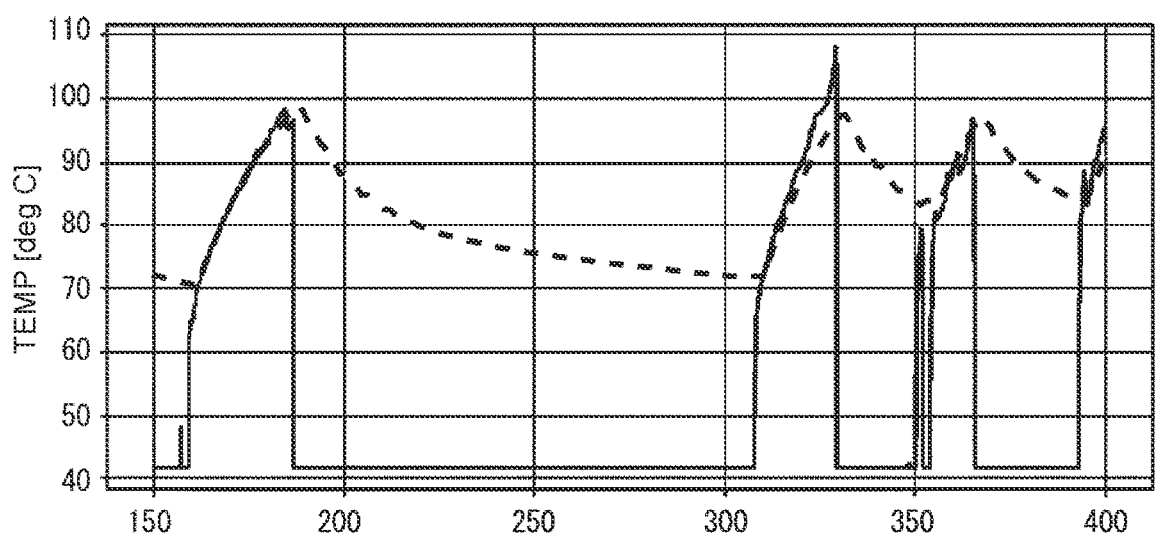
FIG. 5 is a graph showing a result of measuring a motor temperature in advance and a result of estimating the motor temperature according to the first embodiment of the present disclosure.

Here, a method for obtaining the parameters α and β will be described with reference to FIG. 5. FIG. 5 is a graph showing the time series data of the temperature T of the motor measured in advance and the time series data of the temperature T of the motor estimated and calculated by changing the parameters α and β in the formula 1. The vertical axis of FIG. 5 shows the temperature T (° C.) of the motor, and the horizontal axis of FIG. 5 shows the time (seconds).

The estimation calculation of the temperature T of the motor in FIG. 5 is performed by the formula 1 using the time series data of the resistance r and the parameters α and β changed for each appropriate time zone. The vertical axis of FIG. 5 shows the temperature T (° C.) of the motor, and the horizontal axis of FIG. 5 shows the time (seconds). The dotted line represents the result of measuring the motor temperature in advance, and the solid line represents the result of estimating the temperature T of the motor.

The time series data of the temperature T of the motor measured in advance is the first temperature time series data generated by the first temperature time series data generation unit 12 of the motor temperature estimation device 10 shown in FIG. 2, and is indicated by the dotted line in FIG. 5. The time series data of the temperature T of the motor estimated and calculated by changing the parameters α and β in the formula 1 is the second temperature time series data generated by the second temperature time series data generation unit 14 of the motor temperature estimation device 10 shown in FIG. 2, and is indicated by the solid line in FIG. 5. As described above, the second temperature time series data can be obtained by changing the parameters α and β for each appropriate time zone while substituting the time series data of the resistance r generated by the resistance value time series data generation unit 13 into the formula 1.

The parameter determination unit 15 of the motor temperature estimation device 10 shown in FIG. 2 compares the first temperature time series data shown in FIG. 5 and the second temperature time series data. Then, the parameters α and β are determined by performing conformance processing of the first temperature time series data and the second temperature time series data.

More specifically, the parameters α and β are obtained as follows. As shown in FIG. 5, the dotted line and the solid line substantially coincide with each other between 160 seconds and 190 seconds. At this time, the values of the parameters α and β can be estimated as correct values. Therefore, when the temperature T of the motor is calculated using the values of the parameters α and β between 160 seconds and 190 seconds in the case of FIG. 5, it can be said that the estimation accuracy of the motor temperature is high.

The temperature T of the motor can be estimated by obtaining the parameters α and β using the method described above.

Here, after the resistance r of the three-phase AC motor 20 is obtained by the above method, a flow of a process for obtaining the temperature T of the motor will be described with reference to FIG. 6. FIG. 6 is a flowchart of a process for obtaining the temperature T of the motor in the present embodiment.

First, the first temperature time series data generation unit 12 shown in FIG. 2 generates the first temperature time series data based on the temperature change in the three-phase AC motor 20 measured by the temperature sensor TS (step 101). When the three-phase AC motor 20 is installed at a predetermined place and actually used, measurement using the temperature sensor TS is not possible. Therefore, at least step 101 is performed before the three-phase AC motor 20 is installed in a predetermined place, for example.

Next, the resistance value time series data generation unit 13 shown in FIG. 2 generates the time series data of the resistance r of the three-phase AC motor 20 from the voltage equation shown in the formula 4 or the formula 5 using the time series data of the dq-axis voltages $V_d$ and $V_q$ applied to the three-phase AC motor 20 and the time series data of the obtained rotational speed ω and the obtained dq-axis currents $I_d$ and $I_q$ (step 102).

Next, the second temperature time series data generation unit 14 shown in FIG. 2 uses the time-series data of the resistance r obtained in step 102 and changes the parameters α and β to generate the second temperature time series data from the formula 1 (step 103).

The second temperature time series data shown by the solid line in FIG. 5 is generated by changing the parameters α and β at regular time intervals. The parameters α and β are changed in the first temperature time series data shown by the dotted line in FIG. 5 in a time zone in which the temperature is not constant.

Finally, the parameter determination unit 15 shown in FIG. 2 determines the parameters α and β by comparing the generated first and second temperature time series data (step 104). According to the example of FIG. 5, the first and second temperature time series data substantially coincide with each other between 160 seconds and 190 seconds. Therefore, the values of the parameters α and β between 160 seconds and 190 seconds in FIG. 5 can be adopted. By the above processing, the parameters α and β in the formula 1 can be determined. That is, the formula 1 for estimating and calculating the temperature T of the motor can be determined.

Then, the temperature estimation unit 16 shown in FIG. 2 estimates the temperature T of the motor from the resistance r of the three-phase AC motor 20 actually in use by using the formula 1 in which the parameters α and β have been determined.

According to the related technique disclosed in JP 2005-204358 A, the temperature T of the motor is estimated based on the previous temperature and the temperature change value. Therefore, when the power of the motor needs to be turned on again, the temperature change during the time when the power of the motor is turned off is not reflected, and the temperature change caused by the heat source from the outside of the motor is not taken into consideration. As a result, there is a possibility that the estimation of the temperature T of the motor will not be accurate.

On the other hand, the method for estimating the temperature T of the motor in the present embodiment is an estimation method that does not use the previous temperature. Specifically, the temperature T of the motor is sequentially calculated using the formula 1 (T=αr+β) in which only the resistance r that can be calculated from the dq-axis voltages $V_d$ and $V_q$ applied to the motor, and the rotational speed ω and the dq-axis currents $I_d$ and $I_q$ obtained from the motor is used as a variable. Therefore, the method for estimating the temperature T of the motor in the present embodiment is not affected by the initial temperature due to the power of the motor being turned on again or the like. Further, since the temperature change caused by the heat source from the outside of the motor appears as the change of the resistance r in the formula 1, the temperature change is reflected in the estimation result of the temperature T of the motor. As described above, according to the motor temperature estimation device 10 in the present disclosure, the estimation accuracy of the temperature T of the motor can be improved.

OTHER EMBODIMENTS

The motor temperature estimation device 10 in the present disclosure includes, for example, an embodiment as a motor temperature estimation method. That is, the motor temperature estimation method includes a step of generating the first temperature time series data based on the temperature data acquired by the temperature sensor that measures the temperature of the motor, a step of generating the resistance value time series data based on the first temperature time series data, a step of generating the second temperature time series data by changing the parameters for estimating and calculating the temperature of the motor based on the resistance value time series data, and a step of determining the parameters by comparing the first temperature time series data and the second temperature time series data.

The programs in the above example are stored using various types of non-transitory computer readable media and can be supplied to a computer. The non-transitory computer-readable media include various types of tangible storage media. The non-transitory computer-readable media include, for example, magnetic recording media, magneto-optical recording media, compact disc read-only memory (CD-ROM), compact disc recordable (CD-R), compact disc rewritable (CD-R/W), and semiconductor memories. The semiconductor memories include, for example, mask read only memory (ROM), programmable read only memory (PROM), erasable programmable read only memory (EPROM), flash ROM, and random access memory (RAM). Further, the programs may also be supplied to a computer by various types of transitory computer-readable media. Examples of the transitory computer-readable media include electrical signals, optical signals, and electromagnetic waves. The transitory computer-readable media can supply the programs to a computer via a wired communication path such as an electric wire and an optical fiber, or a wireless communication path.

The program is a motor temperature estimation program that causes a computer to execute a process of generating the first temperature time series data based on the temperature data acquired by the temperature sensor that measures the temperature of the motor, a process of generating the resistance value time series data based on the first temperature time series data, a process of generating the second temperature time series data by changing the parameters for estimating and calculating the temperature of the motor based on the resistance value time series data, and a process of determining the parameters by comparing the first temperature time series data and the second temperature time series data.

Although the present disclosure has been described above in accordance with the above embodiments, an applicable embodiment of the present disclosure is not limited to the configuration of the above embodiments, and it goes without saying that the present disclosure includes various modifications, corrections, and combinations that can be made by a person skilled in the art within the gist of the present disclosure.

What is claimed is:

1. A motor temperature estimation system comprising:
    a motor;
    a temperature sensor configured to measure a temperature of the motor;
    a motor control unit configured to output an input voltage to control the motor;
    a first temperature time series data generation unit that generates first temperature time series data based on temperature data acquired by the temperature sensor that measures the temperature of a motor;
    a resistance value time series data generation unit that generates resistance value time series data based on the first temperature time series data;
    a second temperature time series data generation unit that generates second temperature time series data by changing parameters for estimating and calculating the temperature of the motor based on the resistance value time series data; and
    a parameter determination unit that determines the parameters by comparing the first temperature time series data and the second temperature time series data, wherein
    the motor control unit controls the motor by outputting, as the input voltage, dq-axis voltages to the motor, the dq-axis voltages also being input to the resistance value time series data generation unit,
    the resistance value time series data generation unit generates the resistance value time series data based on a current value acquired by applying the dq-axis voltages to the motor and a rotational speed.

2. The motor temperature estimation system according to claim 1, further comprising an estimation calculation unit that estimates and calculates the temperature of the motor using the parameters.

3. The motor temperature estimation system according to claim 2, wherein when a resistance value is defined as r, and the parameters are defined as $\alpha$ and $\beta$, the temperature T of the motor is estimated and calculated by $T=\alpha r+\beta$.

4. A motor temperature estimation method comprising:
    a step of generating first temperature time series data based on temperature data acquired by a temperature sensor that measures a temperature of a motor;
    a step of generating resistance value time series data based on the first temperature time series data;
    a step of generating second temperature time series data by changing parameters for estimating and calculating the temperature of the motor based on the resistance value time series data;
    a step of determining the parameters by comparing the first temperature time series data and the second temperature time series data; and
    a step of controlling the motor, by a motor control unit, by outputting dq-axis voltages, as an input voltage, to the motor, the dq-axis voltages also being input to a resistance value time series data generation unit that generates the resistance value time series data based on the first temperature time series data,
    wherein the resistance value time series data is generated based on a current value acquired by applying the dq-axis voltages to the motor and a rotational speed.

5. A non-transitory computer-readable medium comprising instructions that, when-executed by at least one central processing unit, cause the at least one central processing-unit to perform one or more operations comprising:
    a process of generating first temperature time series data based on temperature data acquired by a temperature sensor that measures a temperature of a motor;
    a process of generating resistance value time series data based on the first temperature time series data;
    a process of generating second temperature time series data by changing parameters for estimating and calculating the temperature of the motor based on the resistance value time series data;
    a process of determining the parameters by comparing the first temperature time series data and the second temperature time series data; and
    a process of controlling the motor, by a motor control unit, by outputting dq-axis voltages, as an input voltage, to the motor, the dq-axis voltages also being input to a resistance value time series data generation unit that generates the resistance value time series data based on the first temperature time series data,
    wherein the resistance value time series data is generated based on a current value acquired by applying the dq-axis voltages to the motor and a rotational speed.

* * * * *